US012804295B2

(12) United States Patent
Hu et al.

(10) Patent No.: US 12,804,295 B2
(45) Date of Patent: Nov. 17, 2026

(54) SOUND-PRODUCING APPARATUS AND ELECTRONIC DEVICE

(71) Applicant: HONOR DEVICE CO., LTD., Shenzhen (CN)

(72) Inventors: Jingtao Hu, Shenzhen (CN); Yubao Cao, Shenzhen (CN); Xuyang Wang, Shenzhen (CN); Yuan Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 175 days.

(21) Appl. No.: 18/865,362

(22) PCT Filed: Apr. 27, 2023

(86) PCT No.: PCT/CN2023/091325
§ 371 (c)(1),
(2) Date: Nov. 13, 2024

(87) PCT Pub. No.: WO2024/037039
PCT Pub. Date: Feb. 22, 2024

(65) Prior Publication Data

US 2025/0310672 A1 Oct. 2, 2025

(30) Foreign Application Priority Data

Aug. 16, 2022 (CN) ......................... 202210979182.6

(51) Int. Cl.
*H04R 1/02* (2006.01)

(52) U.S. Cl.
CPC .......... *H04R 1/025* (2013.01); *H04R 2499/11* (2013.01); *H04R 2499/15* (2013.01)

(58) Field of Classification Search
CPC .. H04R 1/025; H04R 1/2849; H04R 2499/11; H04R 2499/15; H04M 1/035
See application file for complete search history.

(56) References Cited

U.S. PATENT DOCUMENTS 10,701,469 B2 * 6/2020 Park ...................... H04M 1/026
2019/0069056 A1 2/2019 Yoon et al.

(Continued)

FOREIGN PATENT DOCUMENTS

CN 203225864 U 10/2013
CN 203243472 U 10/2013

(Continued)

OTHER PUBLICATIONS

Lu, "Design and Implement of the Smartphone's Audio System" Beijing University of Posts and Telecommunications, Dissertation for the Master Degree, Nov. 15, 2013, 61 pages (with English abstract).

(Continued)

*Primary Examiner* — Jason R Kurr
(74) *Attorney, Agent, or Firm* — Fish & Richardson P.C.

(57) ABSTRACT

This application provides an electronic device comprising a sound-producing apparatus. The sound-producing apparatus includes a speaker, a middle frame, and a screen assembly. The middle frame includes a mounting plane and a border frame. The border frame is located at an edge of the mounting plane, and a mounting hole is provided on the mounting plane. The speaker is arranged on a side of the mounting plane, and is located in a projection region of the mounting hole. The screen assembly is arranged on an other side of the mounting plane, and is located in the projection region of the mounting hole. The speaker and the screen assembly are brought into communication through the mounting hole, and are spaced apart from each other, to form a front cavity of the speaker.

9 Claims, 8 Drawing Sheets

(56) References Cited

U.S. PATENT DOCUMENTS

| | | | | |
|---|---|---|---|---|
| 2019/0098121 | A1* | 3/2019 | Jeon | H04M 1/026 |
| 2019/0098385 | A1 | 3/2019 | Han et al. | |
| 2020/0260166 | A1 | 8/2020 | Wang et al. | |
| 2021/0006876 | A1* | 1/2021 | Moon | G06F 1/1688 |
| 2022/0167079 | A1* | 5/2022 | Kim | H04R 1/2811 |
| 2022/0174140 | A1 | 6/2022 | Yang et al. | |
| 2023/0239386 | A1 | 7/2023 | Zheng | |
| 2024/0305918 | A1 | 9/2024 | Zheng | |

FOREIGN PATENT DOCUMENTS

| | | | |
|---|---|---|---|
| CN | 205491106 | U | 8/2016 |
| CN | 108650345 | A | 10/2018 |
| CN | 209046878 | U | 6/2019 |
| CN | 209562796 | U | 10/2019 |
| CN | 110602606 | A | 12/2019 |
| CN | 210247039 | U | 4/2020 |
| CN | 211127868 | U | 7/2020 |
| CN | 111770216 | A | 10/2020 |
| CN | 111835898 | A | 10/2020 |
| CN | 112261186 | A | 1/2021 |
| CN | 212324354 | U | 1/2021 |
| CN | 113055794 | A | 6/2021 |
| CN | 113497845 | A | 10/2021 |
| CN | 214412788 | U | 10/2021 |
| CN | 215344658 | U | 12/2021 |
| CN | 114125115 | A | 3/2022 |
| EP | 1001547 | A1 | 5/2000 |
| WO | 2017148008 | A1 | 9/2017 |
| WO | 2021129263 | A1 | 7/2021 |

OTHER PUBLICATIONS

Zhang, "South field in the enclosure with an aperture and the sound field radiated from the aperture" Nanjing University, Dissertation for the Master Degree, Mar. 15, 2018, 90 pages (with English abstract).

Long et al., "Further Investigations into the Interactions between Cinema Loudspeakers and Screens" SMPTE Motion Imaging Journal, Nov. 30, 2012, 27 pages.

* cited by examiner (a)

(b)

(a)

(b)

(a)

(b)

SOUND-PRODUCING APPARATUS AND ELECTRONIC DEVICE

CROSS-REFERENCE TO RELATED APPLICATIONS

This application is a national stage of International Application No. PCT/CN2023/091325, filed on Apr. 27, 2023, which claims priority to Chinese Patent Application No. 202210979182.6, filed on Aug. 16, 2022. The disclosures of both of the aforementioned applications are hereby incorporated by reference in their entireties.

TECHNICAL FIELD

This application relates to the field of terminal technologies, and in particular, to a sound-producing apparatus and an electronic device.

BACKGROUND

A speaker configured to play audio is arranged in an electronic device. The speaker includes a sound cavity and a sound outlet channel. A sound emitted from the speaker is transmitted through the sound cavity and the sound outlet channel that are interconnected, and then transmitted out from a sound outlet hole provided on a middle frame, to realize external sound playing by the electronic device. If a height of a front cavity in the sound cavity is relatively small, and an area of the sound outlet channel is small, a flow rate and an eddy current in a sound transmission process are increased, and then abnormal audio playing such as noise, an abnormally low sound, or uneven sound playing is caused, affecting a listening experience of a user.

SUMMARY

Embodiments of this application provide a sound-producing apparatus and an electronic device, to increase a height of a front cavity of a speaker and an area of a sound outlet channel, thereby improving audio playing quality of the speaker and a listening experience of a user.

According to a first aspect, an embodiment of this application provides a sound-producing apparatus, including a speaker, a middle frame, and a screen assembly. The middle frame includes a mounting plane and a border frame. The border frame is located at an edge of the mounting plane, and a mounting hole is provided on the mounting plane. The speaker is arranged on a side of the mounting plane, and is located in a projection region of the mounting hole. The screen assembly is arranged on an other side of the mounting plane, and is located in the projection region of the mounting hole. The speaker and the screen assembly are brought into communication through the mounting hole, and are spaced apart from each other, to form a front cavity of the speaker. A sound outlet hole is provided on the border frame, and a sound outlet ramp is further arranged on the speaker. The sound outlet ramp is located between the sound outlet hole and the front cavity and faces the mounting plane. The sound outlet ramp is spaced apart from the mounting plane and the screen assembly, to form a sound outlet channel in communication with the front cavity and the sound outlet hole.

In this way, no obstruction exists between the speaker and the screen assembly, and the front cavity is directly formed, thereby increasing a height of the front cavity in the front cavity. The sound outlet ramp facing the mounting plane and spaced apart from the mounting plane and the screen assembly is arranged on the speaker. In other words, the sound outlet ramp is inclined in a direction away from the screen assembly, so that the sound outlet ramp, the middle frame, and the screen assembly form a wider sound outlet channel, thereby increasing an area of the sound outlet channel. By increasing the height of the front cavity and the area of the sound outlet channel, an eddy current and a flow rate during sound-producing and sound transmission of the speaker are improved, and abnormal audio playing problems such as noise, an abnormally low sound, or uneven sound playing are eliminated. This enhances the audio playing quality of the speaker, thereby providing the user with a better listening experience. In addition, in this embodiment of this application, a thickness of the sound-producing apparatus and a thickness of the electronic device using the sound-producing apparatus are not increased, and a weight of the sound-producing producing apparatus and a weight of the electronic device may be reduced.

In some implementations, the border frame includes a first end away from the screen assembly, and a second end connected to the screen assembly. A first engagement portion is arranged on the first end of the border frame. A second engagement portion is arranged on the second end of the border frame, and the screen assembly is connected to the second engagement portion. The sound outlet hole is located between the first engagement portion and the second engagement portion. In this way, through mating of the first engagement portion and the second engagement portion on the middle frame, reliable assembly of the speaker and a sealing assembly may be realized to avoid looseness or movement of the speaker, thereby ensuring communication between the sound outlet channel of the sound-producing apparatus and the sound outlet hole, and improving sealing performance of the sound outlet channel.

In some implementations, the sealing assembly is arranged between the speaker and the border frame. The sealing assembly successively includes a first sealing region, a sound outlet region, and a second sealing region along the first end to the second end of the border frame. The speaker is connected to the first engagement portion through the first sealing region. The screen assembly is connected to the second sealing region through the second engagement portion. The sound outlet region corresponds to a position of the sound outlet hole, to cause a sound transmitted from the sound outlet channel to be transmitted through the sound outlet region to the sound outlet hole. In this way, the foregoing three regions are divided for the sealing assembly. The first sealing region is connected to the first engagement portion, and the second sealing region is connected to the second engagement portion. The sound outlet region corresponds to the position of the sound outlet hole, so that the sound emitted from the speaker can be propagated through the front cavity and the sound outlet channel and then the sound outlet region of the sealing assembly, and then out of the electronic device from the sound outlet hole. In addition, a sealing width of the sound outlet channel is increased, thereby improving the sealing performance.

In some implementations, a transition portion is arranged on a side of the second engagement portion facing the sound outlet channel, and the transition portion is an arc-shaped structure. A transition angle matching the transition portion is arranged at a joint between the sound outlet region of the sealing assembly and the second sealing region, and the transition angle is greater than or equal to 90 degrees. A region of the sealing assembly provided with the transition angle mates with and is connected to the transition portion. In this way, through mating of the transition portion and the transition region, stability of the connection between the sealing assembly and the middle frame may be improved, and the sealing performance of the sound outlet channel may be improved. The transition angle is set to be greater than or equal to 90 degrees, so that a space between the sound outlet ramp and the sealing assembly is wider, thereby increasing the area of the sound outlet channel.

In some implementations, the sealing assembly includes a protective layer, a first adhesive layer, a reinforcing layer, and a second adhesive layer that are successively stacked. The first adhesive layer, the reinforcing layer, and the second adhesive layer are hollowed-out structures in the sound outlet region. In this way, through arrangement of the hollowed-out structures, the first adhesive layer, the reinforcing layer, and the second adhesive layer cover only a non-sound outlet region, and the sound outlet region covers only the protective layer, to achieve dustproof and waterproof sealing protection effects and reduce loss generated when the sound passes through the sound outlet region of the sealing assembly.

In some implementations, the sound outlet ramp includes a supporting surface arranged opposite to the first engagement portion. The supporting surface of the sound outlet ramp is connected to the first engagement portion through the first sealing region. In this way, the supporting surface is arranged on the sound outlet ramp, to facilitate sealing of the sound outlet channel, ensure tightness of sealed assembling, increase the space of the front cavity and the area of the sound outlet channel, and improve the audio playing quality of the sound-producing apparatus.

In some implementations, a first protruding portion and a second protruding portion are arranged on a side of the first engagement portion facing the mounting hole. The first protruding portion is inclined in a direction away from the screen assembly, and the second protruding portion is inclined in a direction close to the screen assembly. The supporting surface and the first sealing region are engaged between the first protruding portion and the second protruding portion. In this way, the supporting surface of the speaker and the sealing assembly are engaged between the first protruding portion and the second protruding portion, to prevent looseness or movement of the speaker and the sealing assembly, and ensure connection tightness and sealing performance among the speaker, the sealing assembly, and the middle frame.

In some implementations, the speaker includes a speaker body and a frame for supporting the speaker body. A boss located on a periphery of the mounting hole is further arranged on the mounting plane, and the boss is engaged with the second engagement portion. The frame is fixed to the boss, the speaker body is suspended inside the mounting hole, and the front cavity is formed by a gap between the speaker body and the screen assembly. At least one limiting block is arranged on an end of the second engagement portion close to the mounting hole, and the limiting block is configured to limit the second sealing region. In this way, through mating of the boss and the frame, the speaker body is fixed and suspended in the mounting hole. The mounting hole is a through-hole structure. No occlusion exists between the speaker body and the screen assembly, to implement an open front cavity and increase the height of the front cavity. Through arrangement of the limiting block, the limiting block mates with the first protruding portion and the second protruding portion, so that the sealing assembly is tightly fixed between the first engagement portion and the second engagement portion, to prevent shifting of the sealing assembly, thereby providing a reliable seal for the sound outlet channel.

In some implementations, the sound-producing apparatus further includes a first sealing member and a second sealing member. The first sealing member is arranged between the mounting plane and the screen assembly. The second sealing member is distributed at least between the supporting surface and the first sealing region, and between the boss and the frame. In this way, the first sealing member is configured for sealing between the speaker and the screen assembly, and the second sealing member is configured to hermetically connect an overall outer contour of the speaker to the middle frame, to improve sealing protection performance of the speaker.

According to a second aspect, an embodiment of this application further provides an electronic device, including the sound-producing apparatus according to the first aspect and the implementations thereof.

Figure 1:
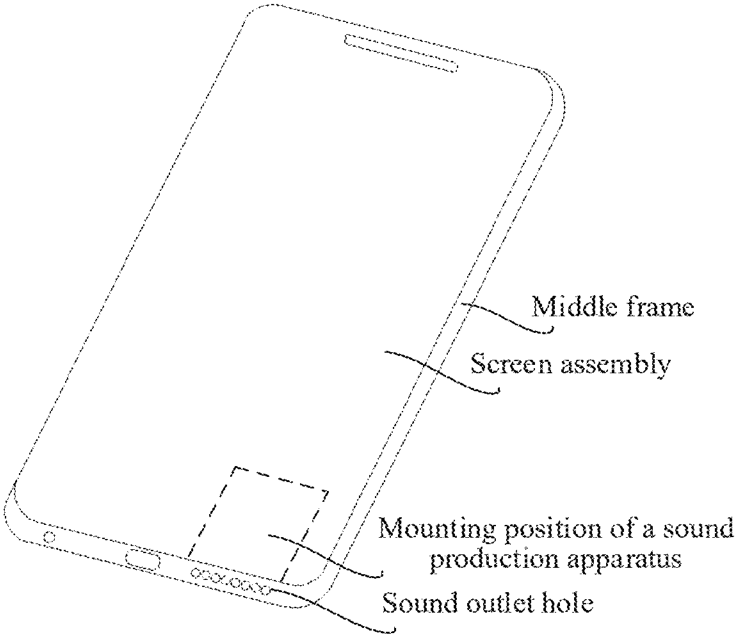
FIG. 1 is a schematic diagram of an electronic device.

In the drawings, 1—Speaker. 101—Speaker body, 102—Bottom plate, 102*a*—Front cavity steel sheet, 102*b*—First component, 102*c*—Second component, 103—Front cavity, 103*a*—Sound outlet side, 104—Sound outlet channel, 105—Sound outlet ramp, 106—Supporting surface, 107—Frame; 2—Middle frame, 201—Border frame, 202—Mounting plane, 203—Mounting hole, 204—Sound outlet hole, 205—First end, 206—Second end, 207—First engagement portion, 207*a*—First protruding portion, 207*b*—Second protruding portion, 208—Second engagement portion, 209—Transition portion, 210—Boss, 211—Limiting block: 3—Screen assembly, 301—Display screen: 4—Sealing assembly, 401—First sealing region, 402—Sound outlet region, 403—Second sealing region, 404—Transition angle, 405—Protective layer, 406—First adhesive layer. 407—Reinforcing layer, 408—Second adhesive layer; 5—First sealing member: 6—Second sealing member.

DESCRIPTION OF EMBODIMENTS

FIG. 1 is a schematic diagram of an electronic device. As shown in FIG. 1, the electronic device may include a screen assembly, a middle frame, and a rear housing. The middle frame may be configured to mount and fix components and devices inside the electronic device, for example, a speaker, a battery, a circuit board, and buttons (including an on/off button and a volume button). A sound outlet hole is arranged on the middle frame. A sound-producing apparatus is mounted to a position in communication with a sound outlet hole inside the electronic device, so that a sound emitted from the sound-producing apparatus is transmitted to outside of the electronic device through the sound outlet hole. A position of the sound outlet hole on the middle frame and a mounting position of the sound-producing apparatus in the electronic device are not limited to an example in FIG. 1.

Figure 2:
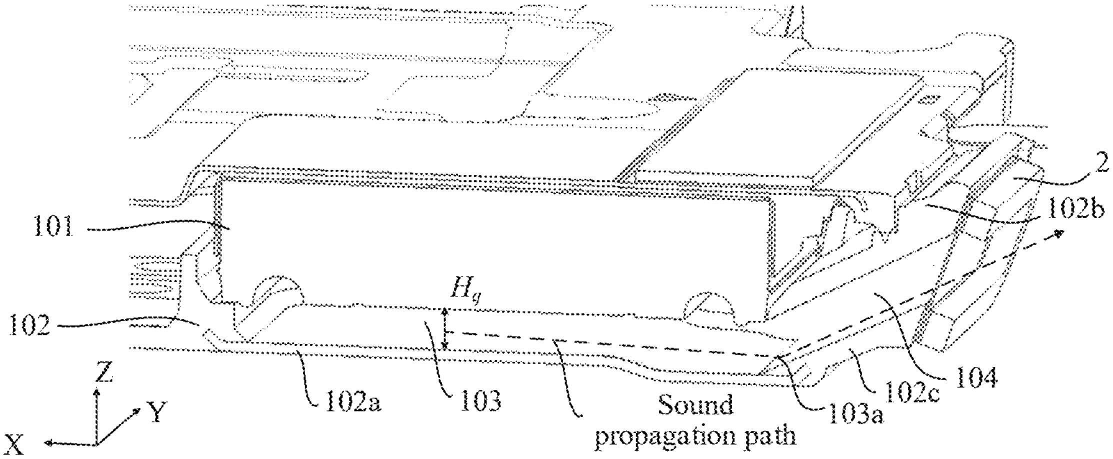
FIG. 2 is a schematic structural diagram of a conventional sound-producing apparatus.

FIG. 2 is a schematic structural diagram of a conventional sound-producing apparatus. As shown in FIG. 2, the sound-producing apparatus includes a speaker body 101 and a bottom plate 102 for supporting the speaker body 101. The speaker body 101 and the bottom plate 102 are distributed in a Z-axis direction. The bottom plate 102 includes a front cavity steel sheet **102*a*, a first component 102*b*, and a second component 102*c*. A specific spacing is defined between the front cavity steel sheet 102*a* and the speaker body 101 along the Z-axis direction, so that a gap between the front cavity steel sheet 102*a* and the speaker body 101 forms a front cavity 103. A side of the front cavity 103 is a sound outlet side 103*a*. On the sound outlet side 103*a* of the front cavity 103, the first component 102*b* is connected to a bottom of the speaker body 101, and the second component 102*e* is connected to the front cavity steel sheet 102*a*, so that a sound outlet channel 104 composed of the first component 102*b* and the second component 102*c* is formed on the sound outlet side 103*a* of the front cavity 103. The sound outlet channel 104 is in communication with the front cavity 103**, to form a propagation path of a sound wave in the sound-producing apparatus.

Generally, a sound cavity of the sound-producing apparatus may include a front cavity 103 and a rear cavity (not shown in the figure), to improve audio playing quality of the sound-producing apparatus. The front cavity 103 is configured to cause sounds to produce a high-frequency cutoff frequency and a high-frequency peak, so as to increase an intermediate frequency, reduce high-frequency noise, reduce high-band extension, and improve sound conversion efficiency. The rear cavity is configured to prevent short circuits of medium and low frequency sounds, and improve intensity of the low-frequency sounds, to cause the sound to be mellower. A structure of the rear cavity is not limited in this application.

To enable a sound emitted from the speaker body 101 to be exported to outside of the electronic device, a sound outlet hole is provided on a middle frame of the electronic device. After the sound-producing apparatus is mounted to the middle frame, the sound outlet channel 104 can be brought into communication with the sound outlet hole. In this way, the sound emitted from the speaker body 101 is propagated through the front cavity 103 and the sound outlet channel 104, and finally out of the electronic device from the sound outlet hole, thereby realizing external sound playing by the electronic device.

As shown in FIG. 2, a sealing assembly 4 may be arranged on an end of the sound outlet channel 104 for communication with the sound outlet hole of the middle frame. The sealing assembly 4 may fill a slit between the sound outlet channel 104 and the middle frame, to seal the sound outlet channel 104 and prevent foreign matters such as water and dust from entering the speaker and the electronic device from the sound outlet hole. The sealing assembly 4 needs to have a sufficient sealing width along the Z-axis direction, to achieve a desirable sealing effect.

Since the entire electronic device has a limited thickness, and the front cavity steel sheet **102*a*** has a specific thickness, a height $H_q$ of the front cavity and an area of the sound outlet channel of the sound-producing apparatus are relatively small due to consideration of a mounting space of other components and devices inside the electronic device. This leads to an increase in a flow rate and an eddy current in a sound transmission process, and then causes abnormal audio playing such as noise, an abnormally low sound, or uneven sound playing, affecting a listening experience of a user.

To increase the height of the front cavity and the area of the sound outlet channel of the sound-producing apparatus and improve the audio playing quality, an embodiment of this application provides a sound-producing apparatus. The sound-producing apparatus may be applied to various electronic devices, to implement a function of audio playing of the electronic device. The electronic device includes, but is not limited to a device such as a mobile phone (including a foldable screen mobile phone), a tablet computer, a notebook computer, a large-screen device (for example, a smart TV and a smart screen), a personal computer (personalcomputer, PC), a handheld computer, a netbook, a personal digital assistant (personal digital assistant, PDA), a wearable electronic device, an on-board device, or a virtual reality device.

Figure 3:
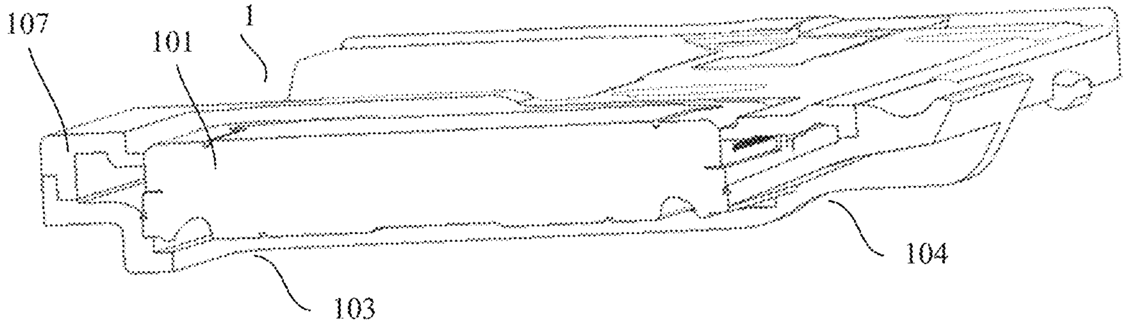
FIG. 3 is a schematic structural diagram of a speaker in a sound-producing apparatus according to an embodiment of this application.
Figure 3:
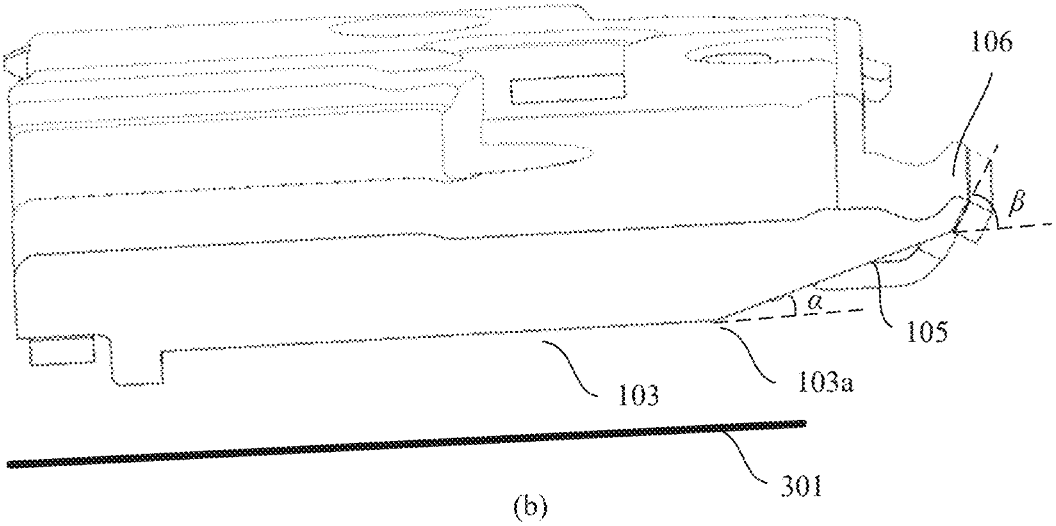

FIG. 3 is a schematic structural diagram of a speaker in a sound-producing apparatus according to an embodiment of this application. As shown in a view (a) of FIG. 2, the speaker 1 includes a speaker body 101. As shown in a view (b) of FIG. 3, in an electronic device, a height difference is defined between a display screen 301 and the speaker body 101 in a Z-axis direction, to form a front cavity 103 of the speaker 1. A sound outlet ramp 105 may be arranged on the speaker 1. The sound outlet ramp 105 is located between a sound outlet hole and the front cavity 103 in an X-axis direction, and the sound outlet ramp 105 is spaced apart from the display screen 301 in the Z-axis direction, to form a sound outlet channel 104 in communication with the front cavity 103 and the sound outlet hole.

In some implementations, as shown in FIG. 3, the speaker 1 further includes a frame 107 for supporting the speaker body 101. The sound outlet ramp 105 is arranged on an end of the frame 107 close to a sound outlet side **103*a* of the front cavity 103. The sound outlet ramp 105 is inclined in a direction away from the display screen 301, and forms a first angle α with a surface facing the display screen 301 that supports the speaker 1. A supporting surface 106 is arranged on an end of the sound outlet ramp 105 away from the front cavity 103. The supporting surface 106 is inclined in a direction away from the display screen 301, and forms a second angle β with a surface facing the display screen 301 that supports the speaker 1**. The second angle β may be greater than the first angle α, to increase a space of the front cavity and an area of the sound outlet channel, and facilitate sealing of the sound outlet channel, thereby ensuring tightness of sealed assembling.

Compared with a structure of a conventional sound-producing apparatus, the front cavity steel sheet 102*a* is removed from the sound-producing apparatus provided in this embodiment of this application, changing the front cavity 103 from a closed form to an open form, and increasing a height of the front cavity. In addition, a second component 102*c* is further removed from the sound-producing apparatus provided in this embodiment of this application, that is, a physical entity below the sound outlet channel 104 is removed, to increase the area of the sound outlet channel below the sound outlet ramp 105. It may be seen that in the sound-producing apparatus provided in this embodiment of this application, the height of the front cavity and the area of the sound outlet channel are increased, an audio playing effect of the speaker is improved, and a weight of the sound-producing apparatus and a weight of the electronic device are reduced.

A sealed structure and a mounting manner of the sound-producing apparatus are described by using an example below with reference to more accompanying drawings.

Figure 4:
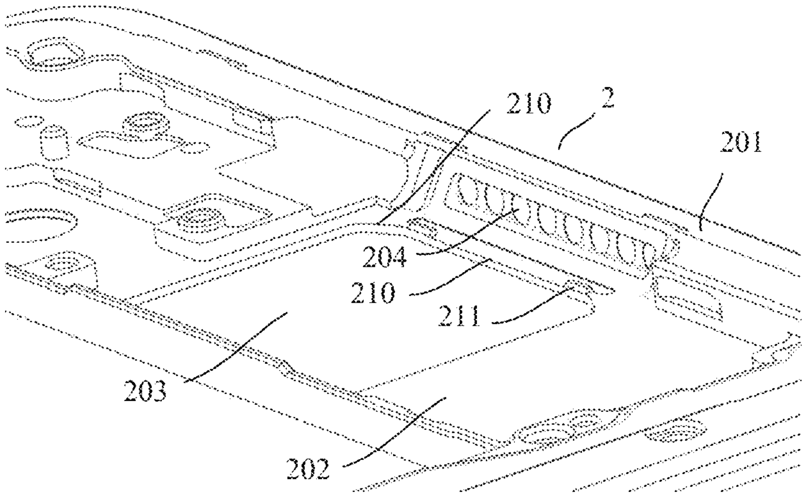
FIG. 4 is a schematic structural diagram of a middle frame in a sound-producing apparatus according to an embodiment of this application.
Figure 4:
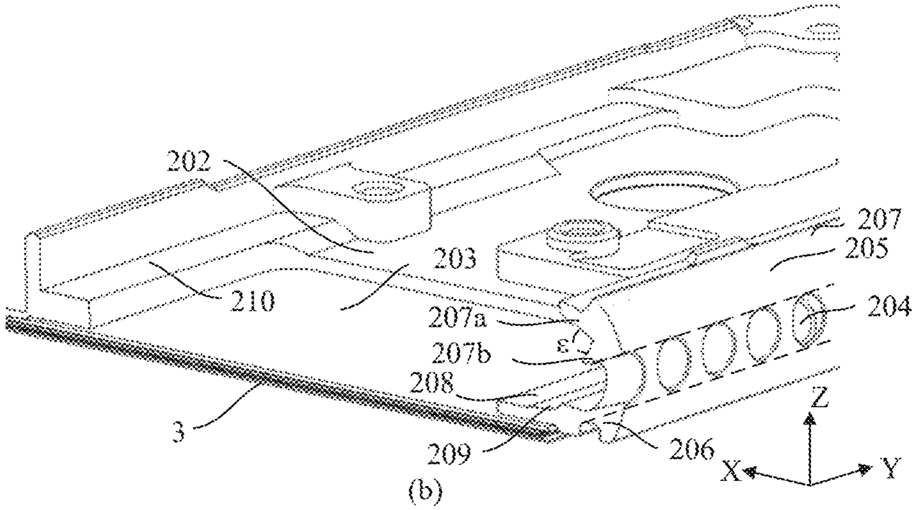

FIG. 4 is a schematic structural diagram of a middle frame in a sound-producing apparatus according to an embodiment of this application. As shown in a view (a) of FIG. 4, a middle frame 2 includes a border frame 201. At least one sound outlet hole 204 may be provided on the border frame 201. The sound outlet hole 204 is located in a projection region of a sound outlet channel in the middle frame 2. The sound outlet hole 204 is used to transmit a sound emitted from a speaker 1 to outside of an electronic device. When a plurality of sound outlet holes 204 are provided on the middle frame 2, an arrangement form of the plurality of sound outlet holes 204 is not limited in embodiments of this application. For example, as shown in FIG. 4, the plurality of sound outlet holes 204 may be distributed in a single-row array. For another example, the plurality of sound outlet holes 204 may be distributed in a multi-row array. The sound outlet hole 204 may be provided as a round hole, a square hole, or a through hole in another shape. This is not limited in embodiments of this application.

As shown in the view (a) and a view (b) of FIG. 4, the middle frame 2 further includes a mounting plane 202, and the border frame 201 is located at an edge of the mounting plane 202. A mounting hole 203 for mounting the speaker 1 is arranged on the mounting plane 202. The mounting hole 203 corresponds to a position of the sound outlet hole 204 in a Y-axis direction. The speaker 1 is arranged on a side of the mounting plane 202, and is located in a projection region of the mounting hole 203 in a Z-axis direction, so that the sound outlet channel 104 can cover and be brought into communication with the sound outlet hole 204 when the speaker 1 is placed in the mounting hole 203. A shape and a dimension of the mounting hole 203 match a shape and a dimension of the speaker 1, to ensure stability and sealing performance of assembly of the speaker 1.

As shown in FIG. 3 and the view (b) of FIG. 4, a screen assembly 3 is arranged on an other side of the mounting plane 202, and the screen assembly 3 is located in the projection region of the mounting hole 203. The speaker 1 and the screen assembly 3 are connected through the mounting hole 203 and are spaced apart from each other, to form a front cavity 103 of the speaker 1. After the speaker 1 is placed in the mounting hole 203, a sound outlet ramp 105 faces a direction of the mounting plane 202, and the sound outlet ramp 105 is spaced apart from the mounting plane 202 and the screen assembly 3 in the Z-axis direction, to form a sound outlet channel 104 in communication with the front cavity 103 and the sound outlet hole 204. A side of the middle frame 2 of the screen assembly 3 facing away from the front cavity 103 and the sound outlet channel 104 is connected to a rear housing (not shown in the figure) of the electronic device, thereby fixing components and devices such as the speaker inside the electronic device and realizing packaging of the entire electronic device. The mounting hole 203 extends through the mounting plane 202 along the Z-axis direction, so that when the speaker 1 is placed in the mounting hole 203, no obstacle and occlusion exist between the speaker body 101 and the screen assembly 3, thereby increasing a height of the front cavity.

The screen assembly 3 may include an inner screen and an outer screen. The inner screen is configured to display an image (that is, a display screen 301), and the outer screen is arranged outside the inner screen. In an implementation, the outer screen may include a cover plate and a touch panel (that is, a touch screen), so that the screen assembly 3 supports a touch function. In another implementation, the outer screen may include the cover plate instead of the touch panel. In this way, the outer screen may be configured to protect the inner screen and avoid damage to the inner screen.

In this embodiment of this application, when the screen assembly 3 includes the inner screen and the outer screen, the mounting plane 202 of the middle frame 2 is connected to the inner screen of the screen assembly 3.

As shown in FIG. 3 and the view (b) of FIG. 4, the border frame 201 includes a first end 205 away from the screen assembly 3 in the Z-axis direction, and a second end 206 connected to the screen assembly 3. A first engagement portion 207 is arranged on the first end 205 of the border frame 201. The first engagement portion 207 is configured to connect a sealing assembly 4 and a supporting surface 106 of the speaker 1. A first protruding portion 207*a* and a second protruding portion 207*b* distributed along the Y-axis direction are arranged on a side of the first engagement portion 207 facing the mounting hole 203. The first protruding portion 207*a* is inclined in a direction away from the screen assembly 3, and the second protruding portion 207*b* is inclined in a direction close to the screen assembly 3, so that an included angle ε is formed between the first protruding portion 207*a* and the second protruding portion 207*b*. In this way, the supporting surface 106 of the speaker 1 and the sealing assembly 4 are engaged between the first protruding portion 207*a* and the second protruding portion 207*b*, to prevent looseness or movement of the speaker 1 and the sealing assembly 4. An angle of the included angle ε is not limited. For example, the break angle ε is set to 90°.

As shown in FIG. 4, a second engagement portion 208 is arranged on the second end 206 of the border frame 201, and the screen assembly 3 is connected to the second engagement portion 208. The second engagement portion 208 is configured to connect to the sealing assembly 4. The sound outlet hole 204 is located between the first engagement portion 207 and the second engagement portion 208 in the Z-axis direction.

A boss 210 located on a periphery of the mounting hole 203 is further arranged on the mounting plane 202, and the boss 210 is engaged with the second engagement portion 208. When the speaker 1 is placed in the mounting hole 203, the speaker body 101 is located inside the mounting hole 203, and the boss 210 is configured to support the frame 107 of the speaker 1. The speaker 1 may be fixed to the mounting hole 203 of the middle frame 2 through mating of the first engagement portion 207, the second engagement portion 208, and the boss 210. The speaker body 101 is suspended inside the mounting hole 203, and a sealed front cavity 103 is formed through mating of the screen assembly 3 and the rear housing. In this way, the sound emitted from the speaker 1 may be transmitted outward through the front cavity 103 and the sound outlet channel 104, and finally transmitted from the sound outlet hole 204 to outside of the electronic device.

Figure 5:
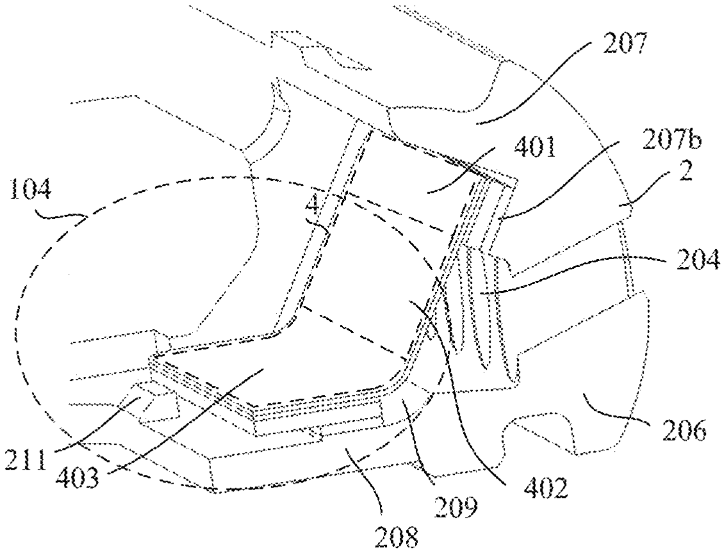
FIG. 5 is a schematic sectional assembly diagram of a middle frame and a sealing assembly in a sound-producing apparatus according to an embodiment of this application.

FIG. 5 is a schematic assembly diagram of a middle frame and a sealing assembly in a sound-producing apparatus according to an embodiment of this application. As shown in FIG. 5, a sealing assembly 4 may be arranged between a speaker 1 and a border frame 201. The sealing assembly 4 may be divided into three regions along a first end 205 to a second end 206 of the border frame 201, which are respectively a first sealing region 401, a sound outlet region 402, and a second sealing region 403. The first sealing region 401 corresponds to positions of a first engagement portion 207 in a Z-axis direction and a Y-axis direction, and is configured to seal a side of a sound outlet channel 104 close to a second protruding portion 207*b*. The second sealing region 403 corresponds to positions of a second engagement portion 208 in the Z-axis direction and the Y-axis direction, and is configured to seal a side of the sound outlet channel 104 close to the second end 206 of a middle frame 2. The sound outlet region 402 corresponds to a position of a hole array formed by a plurality of sound outlet holes 204 in the Z-axis direction and the Y-axis direction. That is, the sound outlet region 402 covers all of the sound outlet holes 204 in the Z-axis direction and the Y-axis direction, so that the sound transmitted by the sound outlet channel 104 can be transmitted through the sound outlet region to the sound outlet holes 204 and transmitted out from each of the sound outlet holes 204. The first sealing region 401 and the second sealing region 403 have sufficient sealing widths on two sides of the sound outlet channel 104 in the Z-axis direction, thereby ensuring sealing performance of the sound outlet channel, preventing sound leakage from the speaker and foreign matters such as water and dust from permeating the electronic device, and enhancing audio playing quality of the speaker.

Figure 6:
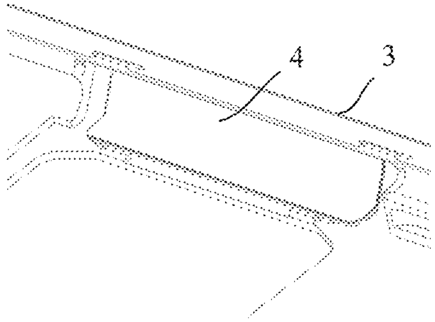
FIG. 6 is an assembly effect diagram of a middle frame and a sealing assembly in a sound-producing apparatus according to an embodiment of this application.

As shown in FIG. 5, the first sealing region 401 is connected to the first engagement portion 207, and the second sealing region 403 of the sealing assembly 4 is connected to the second engagement portion 208. To ensure that the sound can penetrate the sealing assembly 4 and be transmitted out from the sound outlet hole 204, and prevent a sound wave from being blocked and lost, the sound outlet region 402 corresponding to the sound outlet hole 204 on the sealing assembly 4 may be sealed in a non-hermetic manner. For example, only a dustproof net is arranged. An assembly effect of the sealing assembly 4 and the middle frame 2 is shown in FIG. 6.

As shown in FIG. 4 and FIG. 5, to facilitate mounting of the sealing assembly 4 and ensure the sealing performance of the assembly, a transition portion 209 may be arranged on a side of the second engagement portion 208 facing the sound outlet channel 104. The transition portion 209 may be arranged as a smooth arc-shaped structure.

As shown in FIG. 4 and FIG. 5, at least one limiting block 211 may be further arranged on an end of the second engagement portion 208 close to the mounting hole 203. The limiting block 211 is configured to limit the second sealing region 403 of the sealing assembly 4. Refer to FIG. 5 and FIG. 6. The sealing assembly 4 is fixed between the first engagement portion 207 and the second engagement portion 208 through mating of the limiting block 211, the first protruding portion 207*a*, and the second protruding portion 207*b*, to prevent shifting of the sealing assembly 4, thereby providing a reliable seal for the sound outlet channel 104.

Figure 7:
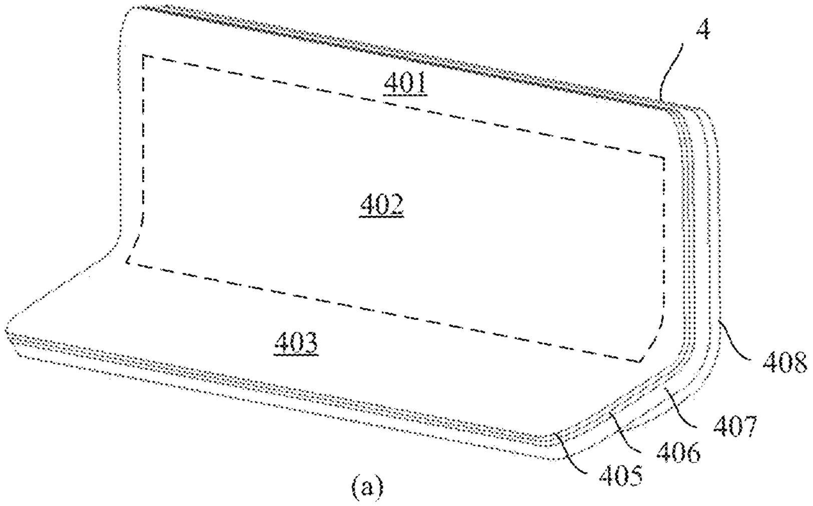
FIG. 7 is a schematic structural diagram of a sealing assembly in a sound-producing apparatus according to an embodiment of this application.
Figure 7:
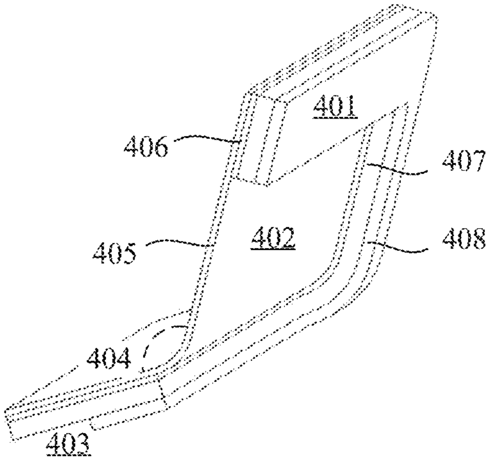

FIG. 7 is a schematic structural diagram of a sealing assembly in a sound-producing apparatus according to an embodiment of this application. A view (a) of FIG. 7 shows an overall structure of the sealing assembly, and a view (b) of FIG. 7 shows a sectional structure of the sealing assembly.

As shown in FIG. 7, a sealing assembly 4 may be arranged as a curved structure. A transition angle 404 that matches a transition portion 209 is provided at a joint between a second sealing region 403 and a sound outlet region 402. In this way, a transition region corresponding to the transition angle 404 exists on the sealing assembly 4. The transition region mates with and is connected to the transition portion 209, so as to improve stability of connection between the sealing assembly 4 and a middle frame 2, and improve sealing performance of a sound outlet channel.

As shown in FIG. 7, the sealing assembly 4 may include a protective layer 405, a first adhesive layer 406, a reinforcing layer 407, and a second adhesive layer 408 that are successively stacked. A thickness of each layer in the sealing assembly 4 is not limited, and may be set based on requirements for the sealing performance, connection strength, a weight, and the like.

The protective layer 405 may adopt a dustproof net to prevent dust. The dustproof net may be made of a material such as metal or a plastic. The first adhesive layer 406 is configured to bond the protective layer 405 and the reinforcing layer 407, and the second adhesive layer 408 is configured to bond the reinforcing layer 407 and a first engagement portion 207. The first adhesive layer 406 and the second adhesive layer 408 may be made of a material with good adhesion and attachment characteristics, such as a back adhesive and a double-sided tape. The reinforcing layer 407 can improve the overall strength and the sealing performance of the sealing assembly 4, and avoid problems such as deformation of the sealing assembly 4, loose sealing of the adhesive layer, and wrinkles on the dustproof net. The reinforcing layer 407 may be made of a metal material, for example, steel sheets and stainless steel.

As shown in the view (b) of FIG. 7, the protective layer 405 covers the sound outlet region 402 and a non-sound outlet region. The non-sound outlet region includes a first sealing region 401 and a second sealing region 403. The first adhesive layer 406, the reinforcing layer 407, and the second adhesive layer 408 are hollowed-out structures in the sound outlet region 402. In other words, the first adhesive layer 406, the reinforcing layer 407, and the second adhesive layer 408 cover only the non-sound outlet region. In this way, the sound outlet region 402 covers only the protective layer 405, to achieve dustproof and waterproof sealing protection effects and reduce loss generated when the sound passes through the sound outlet region of the sealing assembly 4.

Figure 8:
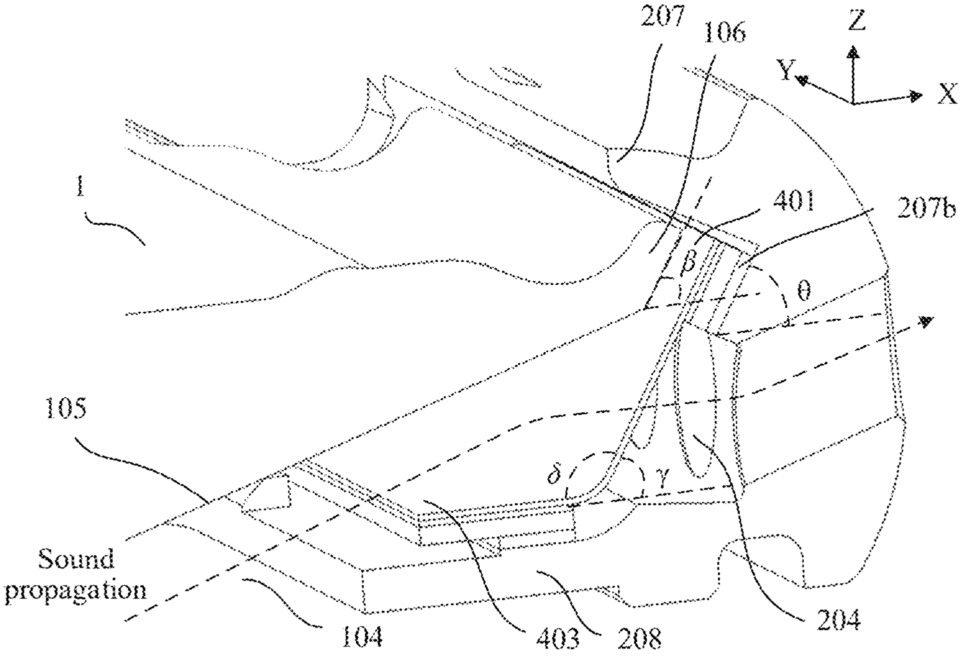
FIG. 8 is a schematic sectional assembly diagram of a speaker, a sealing assembly, and a middle frame in a sound-producing apparatus according to an embodiment of this application.

FIG. 8 is a schematic sectional assembly diagram of a speaker, a sealing assembly, and a middle frame in a sound-producing apparatus according to an embodiment of this application. As shown in FIG. 8, a speaker 1 is connected to a first engagement portion 207 through a first sealing region 401. The first engagement portion 207 of a middle frame 2 is engaged with a supporting surface 106 of the speaker 1, and the supporting surface 106 is connected to the first sealing region 401 of a sealing assembly 4. A front cavity 103, a sound outlet channel 104 below a sound outlet ramp 105, and a sound outlet hole 204 form a sound propagation path. A sound emitted from a speaker body 101 is transmitted through the front cavity 103 and the sound outlet channel 104 and through a protective layer 405 of the sealing assembly 4, and finally transmitted out from the sound outlet hole 204.

As shown in FIG. 8, the supporting surface 106 on the sound outlet ramp 105 is arranged opposite to the first engagement portion 207, and the supporting surface 106 and the first engagement portion 207 are connected through the first sealing region 401. To ensure that the supporting surface 106 is tightly attached to the first sealing region 401, an inclination angle β of the supporting surface 106 needs to be equal to an inclination angle γ of the first sealing region 401. The first sealing region 401 and a sound outlet region 402 have a same inclination angle. To ensure that the first sealing region 401 is tightly attached to a second protruding portion 207*b*, the inclination angle γ needs to be equal to an inclination angle θ of an end surface of the second protruding portion 207*b*. Therefore, the inclination angle β, the inclination angle γ, and the inclination angle θ are related and consistent. If an inclination angle after a second sealing region 403 and a second engagement portion 208 are fixedly connected is 0°, and an angle of a transition angle 404 is represented by δ, a magnitude of the transition angle δ directly affects the inclination angle γ. Therefore, the inclination angle β and the inclination angle θ may be associatively set based on the transition angle δ of the sealing assembly 4, to ensure tightness of connection and sealing performance among the speaker 1, the sealing assembly 4, and the middle frame 2. For example, $\beta=\theta=\gamma=180°-\delta$ is set.

As shown in FIG. 8, the transition angle δ may be set to be greater than or equal to 90°, so that a space between the sound outlet ramp 105 and the sealing assembly 4 is wider, thereby increasing an area of the sound outlet channel.

Figure 9:
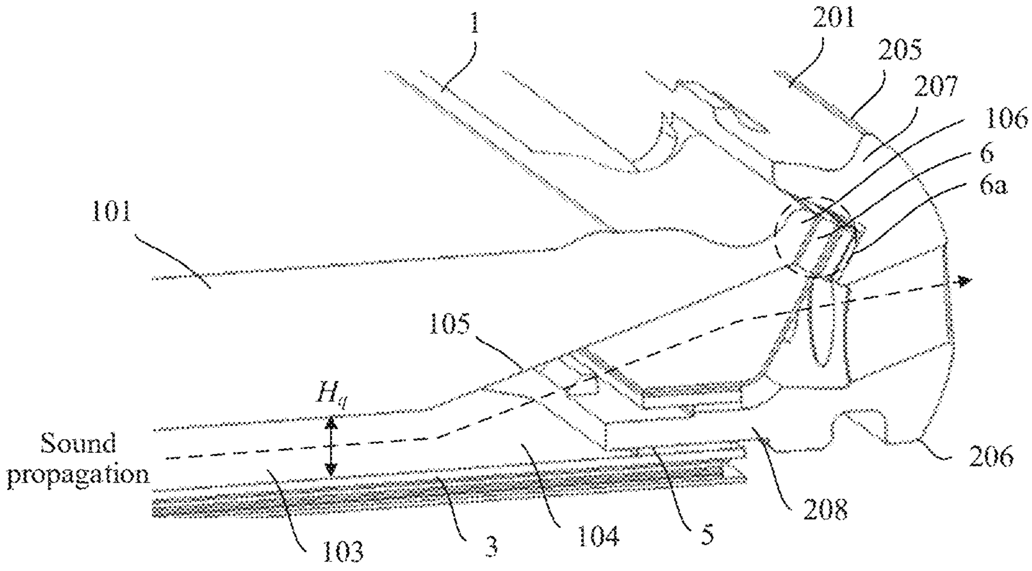
FIG. 9 is a schematic sectional view of an overall assembly structure of a sound-producing apparatus according to an embodiment of this application.

FIG. 9 is a schematic sectional view of an overall assembly structure of a sound-producing apparatus according to an embodiment of this application. As shown in FIG. 9, at a first end 205 of a border frame 201, a supporting surface 106 of a speaker 1 is connected to a first engagement portion 207 through a first sealing region 401. At a second end 206 of the border frame 201, a screen assembly 3 is connected to a second sealing region 403 through a second engagement portion 208. After the speaker 1, a sealing assembly 4, a middle frame 2, and the screen assembly 3 are connected, a hermetic front cavity 103 is formed. A mounting hole 203 extending through a mounting plane 202 in a Z-axis direction is provided, and the speaker 1 is arranged as an open front cavity. After the speaker 1 is fixed to the mounting hole 203, a height $H_q$ of the front cavity is a height difference between a speaker body 101 and the screen assembly 3. In a case that a thickness of an electronic device body and a thickness of the speaker body 101 are not affected, a height increase of the open front cavity is equal to a thickness of a front cavity steel sheet 102*a*, which increases the height of the front cavity. A sound outlet ramp 105, the sealing assembly 4, the middle frame 2, and the screen assembly 3 form a sealed sound outlet channel 104. Through such structural designs as arranging the sealing assembly 4 having the transition angle δ, properly increasing the first angle α of the sound outlet ramp 105, and removing the second component 102*c*, an area of the sound outlet channel can be increased, a flow rate and an eddy current can be reduced, and audio playing quality of the speaker can be improved. Moreover, it can be further ensured that the sound outlet channel 104 has a sufficient sealing width in a Z-axis direction, thereby improving sealing performance and avoiding sound leakage from the speaker and failure of components and devices as a result of immersion of foreign matters into the electronic device.

Figure 10:
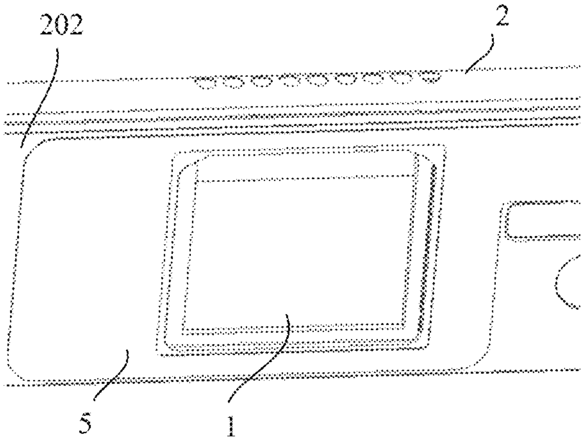
FIG. 10 is a schematic diagram of a first sealing member arranged between a middle frame and a screen assembly in a sound-producing apparatus according to an embodiment of this application.

FIG. 10 is a schematic diagram of a first sealing member arranged between a middle frame and a screen assembly in a sound-producing apparatus according to an embodiment of this application. As shown in FIG. 9 and FIG. 10, a first sealing member 5 is arranged between the mounting plane 202 and the screen assembly 3. The first sealing member 5 does not cover at least a front cavity 103 of a speaker 1 and a sound outlet channel 104, to ensure that a height of the front cavity and an area of the sound outlet channel are not reduced. A coverage range of the first sealing member 5 may be designed based on types, mounting positions, performance requirements, sealing requirements, and the like of components and devices on a middle frame 2. The first sealing member 5 may be made of a foam material. Foam has elasticity. By compressing the foam, a specific amount of compression is applied to the foam to fully activate sealing performance of the foam. The amount of compression of the foam may be set to be greater than or equal to 50%. In addition, the foam further has characteristics such as anti-vibration, a thin volume, and a light weight, which not only can improve sealing performance of the speaker, and but also facilitates a reduction in a weight of an electronic device.

Figure 11:
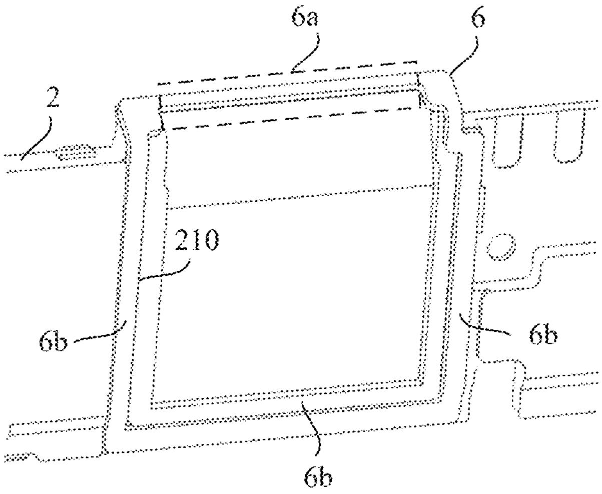
FIG. 11 is a schematic diagram of a second sealing member arranged between a speaker and a middle frame in a sound-producing apparatus according to an embodiment of this application.

FIG. 11 is a schematic diagram of a second sealing member arranged between a speaker and a middle frame in a sound-producing apparatus according to an embodiment of this application. As shown in FIG. 9 and FIG. 11, a second sealing member 6 may be arranged between the speaker 1 and the middle frame 2. The second sealing member 6 is distributed at least in a contact region 6*a* between the supporting surface 106 and the first sealing region 401, and a supporting region 6*b* of the boss 210 for the frame 107 of the speaker 1. By arranging the second sealing member 6, hermetic connection between the overall outer contour of the speaker 1 and the middle frame 2 is implemented, and the sealing protection performance of the speaker 1 is improved. The second sealing member 6 may also be made of a foam material. An amount of compression of the foam may be set to be greater than or equal to 50%.

The speaker 1 and other components and devices and modules included within the electronic device may be all mounted to the middle frame 2 between the screen assembly 3 and a rear housing. In this regard, in addition to a region of mounting hole 203 for mounting the speaker 1, components and devices such as a main board, a memory, a battery, a camera, and a sound collector may be further mounted to the mounting plane 202 of the middle frame 2. In this application, structures, assembly, and sealing of other components and devices and modules other than the speaker are not limited, and a software function configuration of the electronic device is not limited. If the electronic device is equipped with a plurality of speakers, the height of the front cavity and the area of the sound outlet channel corresponding to each speaker may be increased by referring to the structure and the sealing assembly manner of the foregoing sound-producing apparatus.

Figure 12:
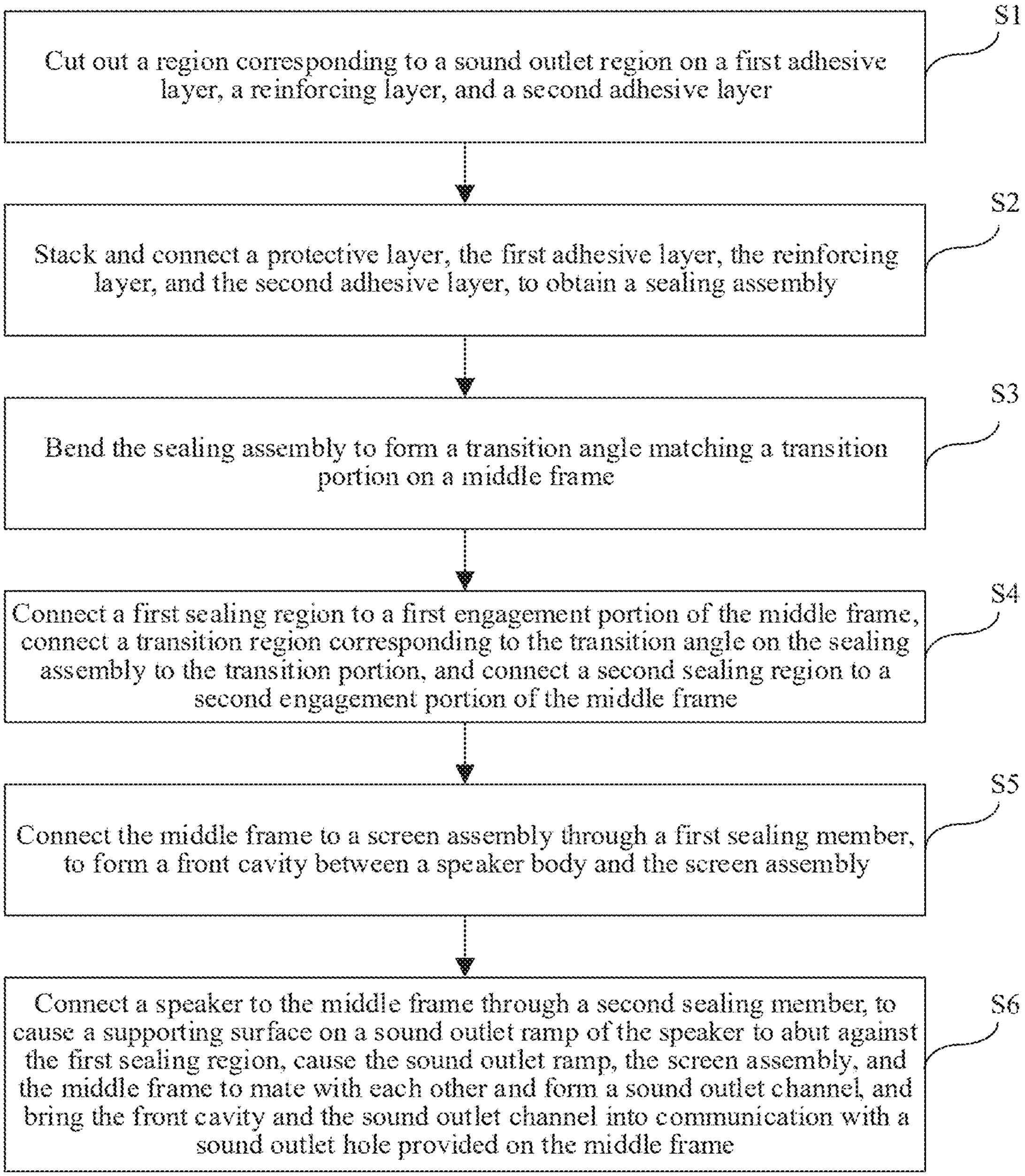
FIG. 12 is a flowchart of a method for mounting a sound-producing apparatus according to an embodiment of this application.

Based on the structure of the sound-producing apparatus provided in FIG. 3 to FIG. 11, an embodiment of this application further provides a method for mounting a sound-producing apparatus. As shown in FIG. 12, the method includes the following steps.

Step S1: Cut out a region corresponding to a sound outlet region on a first adhesive layer, a reinforcing layer, and a second adhesive layer.

Step S2: Stack and connect the protective layer, the first adhesive layer, the reinforcing layer, and the second adhesive layer, to obtain a sealing assembly.

The sealing assembly further has a non-sound outlet region. The non-sound outlet region includes a first sealing region and a second sealing region. The first sealing region is located on a side of the sound outlet region away from a screen assembly in a Z-axis direction, and the second sealing region is located on a side close to the screen assembly in the Z-axis direction.

Step S3: Bend the sealing assembly to form a transition angle matching a transition portion on a middle frame.

Step S4: Connect the first sealing region to a first engagement portion of the middle frame, connect a transition region corresponding to the transition angle on the sealing assembly to a transition portion, and connect the second sealing region to a second engagement portion of the middle frame.

Step S5: Connect the middle frame to the screen assembly through a first sealing member, to form a front cavity between a speaker body and the screen assembly.

Step S6: Connect a speaker to the middle frame through a second sealing member, to cause a supporting surface on a sound outlet ramp of the speaker to abut against the first sealing region, cause the sound outlet ramp, the screen assembly, and the middle frame to mate with each other and form a sound outlet channel, and bring the front cavity and the sound outlet channel into communication with a sound outlet hole provided on the middle frame.

An order and a manner of sealing and mounting the sound-producing apparatus are not limited to the foregoing method embodiments.

In embodiments of this application, the sound-producing apparatus adopts the open front cavity, and a structural component that reduces the height of the front cavity does not exist between the speaker body and the screen assembly, which increases the height of the front cavity. By arranging the sound outlet ramp on the speaker and a specially designed sealing assembly and through mating of the mounting hole 203 and the boss 210, the area of the sound outlet channel is increased. Therefore, an eddy current and a flow rate during sound generation and sound propagation of the speaker are increased, abnormal audio playing problems such as noise, an abnormally low sound, or uneven sound playing are eliminated, and audio playing quality of the speaker is improved. In addition, a stable and reliable sealing structure is provided for the speaker, to prevent foreign matters such as dust and liquids from permeating the speaker and the electronic device. In this way, effective protection is provided for the speaker and other components and devices, the thickness of the electronic device is not increased, the weight of the sound-producing apparatus and the weight of the electronic device are reduced.

An embodiment of this application further provides an electronic device. The electronic device includes at least one sound-producing apparatus in the foregoing embodiments and the implementations thereof.

In the foregoing specific implementations, objectives, technical solutions, and benefits of embodiments of this application are further described in detail. It should be understood that the foregoing descriptions are merely specific implementations of embodiments of this application, and are not intended to limit the protection scope of embodiments of this application. Any modification, equivalent replacement, or improvement made based on the technical solutions of embodiments of this application shall fall within the protection scope of embodiments of this application.

The invention claimed is:

1. An electronic device, comprising a sound-producing apparatus, the sound-producing apparatus comprising a speaker, a middle frame, and a screen assembly, wherein the middle frame comprises a border frame and a mounting plane;

the border frame is located at an edge of the mounting plane, and a mounting hole is provided on the mounting plane, and a boss is arranged on a periphery of the mounting hole;

the speaker is arranged on the boss, and is located in a projection region of the mounting hole;

the screen assembly is arranged on the side of the mounting plane which is away from the boss, and is located in the projection region of the mounting hole;

the speaker and the screen assembly are brought into communication through the mounting hole, and are spaced apart from each other, to form a front cavity of the speaker;

a sound outlet hole is provided on the border frame, and a sound outlet ramp is further arranged on the speaker; and the sound outlet ramp is located between the sound outlet hole and the front cavity and faces the mounting plane, and the sound outlet ramp is inclined in a direction away from the screen assembly; and the sound outlet ramp is spaced apart from the mounting plane and the screen assembly, to form a sound outlet channel in communication with the front cavity and the sound outlet hole.

2. The electronic device according to claim 1, wherein the border frame comprises a first end away from the screen assembly, and a second end connected to the screen assembly;

a first engagement portion is arranged on the first end of the border frame;

a second engagement portion is arranged on the second end of the border frame, and the screen assembly is connected to the second engagement portion; and the sound outlet hole is located between the first engagement portion and the second engagement portion.

3. The electronic device according to claim 2, further comprising a sealing assembly, wherein the sealing assembly is arranged between the speaker and the border frame;

the sealing assembly successively comprises a first sealing region, a sound outlet region, and a second sealing region along the first end to the second end of the border frame;

the speaker is connected to the first engagement portion through the first sealing region;

the screen assembly is connected to the second sealing region through the second engagement portion; and the sound outlet region corresponds to a position of the sound outlet hole, to cause a sound transmitted from the sound outlet channel to be transmitted through the sound outlet region to the sound outlet hole.

4. The electronic device according to claim 3, wherein a transition portion is arranged on a side of the second engagement portion facing the sound outlet channel, and the transition portion is an arc-shaped structure;

a transition angle matching the transition portion is arranged at a joint between the sound outlet region and the second sealing region, and the transition angle is greater than or equal to 90 degrees; and a region of the sealing assembly provided with the transition angle mates with and is connected to the transition portion.

5. The electronic device according to claim 3, wherein the sealing assembly comprises a protective layer, a first adhesive layer, a reinforcing layer, and a second adhesive layer that are successively stacked; and the first adhesive layer, the reinforcing layer, and the second adhesive layer are hollowed-out structures in the sound outlet region.

6. The electronic device according to claim 4, wherein the sound outlet ramp comprises a supporting surface arranged opposite to the first engagement portion; and the supporting surface is connected to the first engagement portion through the first sealing region.

7. The electronic device according to claim 6, wherein a first protruding portion and a second protruding portion are arranged on a side of the first engagement portion facing the mounting hole;

the first protruding portion is inclined in a direction away from the screen assembly, and the second protruding portion is inclined in a direction close to the screen assembly; and the supporting surface and the first sealing region are engaged between the first protruding portion and the second protruding portion.

8. The electronic device according to claim 6, wherein the speaker comprises a speaker body and a frame for supporting the speaker body;

and the boss is engaged with the second engagement portion;

the frame is fixed to the boss, the speaker body is suspended inside the mounting hole, and the front cavity is formed by a gap between the speaker body and the screen assembly; and at least one limiting block is arranged on an end of the second engagement portion close to the mounting hole, and the limiting block is configured to limit the second sealing region.

9. The electronic device according to claim 8, further comprising a first sealing member and a second sealing member, wherein the first sealing member is arranged between the mounting plane and the screen assembly; and the second sealing member is distributed at least between the supporting surface and the first sealing region and between the boss and the frame.

* * * * *